United States Patent
Hung et al.

(10) Patent No.: US 11,632,824 B2
(45) Date of Patent: Apr. 18, 2023

(54) METHOD FOR ACTIVELY VERIFYING WHETHER CANDIDATE PEER IS MESH GATE AND METHOD FOR DETERMINING PRIMARY MESH GATE

(71) Applicant: REALTEK SEMICONDUCTOR CORPORATION, Hsinchu (TW)

(72) Inventors: Chia-Feng Hung, Hsinchu (TW);
Shun-Yin Chiu, Hsinchu County (TW);
Yu-Yen Ting, Changhua County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 127 days.

(21) Appl. No.: 17/372,781

(22) Filed: Jul. 12, 2021

(65) Prior Publication Data
US 2021/0345452 A1     Nov. 4, 2021

Related U.S. Application Data

(62) Division of application No. 16/824,397, filed on Mar. 19, 2020, now Pat. No. 11,109,446.

(30) Foreign Application Priority Data

Mar. 21, 2019    (TW) .................................. 108109692

(51) Int. Cl.
*H04W 84/18*     (2009.01)
*H04W 84/12*     (2009.01)
(Continued)

(52) U.S. Cl.
CPC ............. *H04W 84/18* (2013.01); *H04L 45/16* (2013.01); *H04W 40/22* (2013.01); *H04W 48/16* (2013.01);
(Continued)

(58) Field of Classification Search
CPC ..... H04W 84/18; H04W 40/22; H04W 48/16; H04W 76/15; H04W 84/12; H04W 92/02; H04L 45/16
(Continued)

(56) References Cited

U.S. PATENT DOCUMENTS

2009/0175238 A1    7/2009   Jetcheva et al.
2013/0265909 A1*   10/2013   Park ........................ H04L 45/26
                                                                                                                                       370/255
(Continued)

*Primary Examiner* — Michael Y Mapa
(74) *Attorney, Agent, or Firm* — WPAT, PC

(57) ABSTRACT

A method for verifying whether a candidate peer functions as a mesh gate is performed by a network device in a mesh basic service set including the candidate peer. The method includes: providing a record indicates that the candidate peer doesn't function as the mesh gate, when the network device receives a notification from the candidate peer indicating that the candidate peer now functions as the mesh gate, having the network device update the record and start a counting process and verifying whether the candidate peer continues functioning as the mesh gate till the end of the counting process; when the network device doesn't receive an updated notification from the candidate peer indicating that the candidate functions as the mesh gate before the end of the counting process, having the network device send a packet to the candidate peer to verify whether the candidate peer functions as the mesh gate.

14 Claims, 7 Drawing Sheets

S310 — in a circumstance that a current record of the network device indicates that the candidate peer does not function as the mesh gate, when the network device receives a first notification indicative of the candidate peer functioning as the mesh gate now, having the network device update the current record and start a counting process and then verifying whether the candidate peer continues functioning as the mesh gate till the end of the counting process S320 — when the network device fails to receive an updated first notification indicative of the candidate functioning as the mesh gate from the candidate peer before the end of the counting process, having the network device send an inquiring packet to the candidate peer to verify whether the candidate peer is still functioning as the mesh gate S330 — after the network device sends the inquiring packet, when the network device receives the updated first notification or receives a first reply packet indicative of the candidate peer functioning as the mesh gate, having the network device restart the counting process and verifying whether the candidate peer continues functioning as the mesh gate till the end of the counting process again

(51) Int. Cl.
   *H04W 40/22* (2009.01)
   *H04L 45/16* (2022.01)
   *H04W 76/15* (2018.01)
   *H04W 48/16* (2009.01)
   *H04W 92/02* (2009.01)

(52) U.S. Cl.
   CPC ........... *H04W 76/15* (2018.02); *H04W 84/12* (2013.01); *H04W 92/02* (2013.01)

(58) Field of Classification Search
   USPC ........ 370/338, 406; 455/41.1–41.2, 500, 507
   See application file for complete search history.

(56) References Cited

U.S. PATENT DOCUMENTS

2013/0336277 A1* 12/2013 Kim ...................... G01S 5/0289
                                                                370/329
2015/0373618 A1    12/2015 Deenoo et al.
2018/0139676 A1*  5/2018 Bai ......................... H04L 47/32

* cited by examiner

S510 — in a circumstance that the current record of the network device is indicative of the candidate peer functioning as the mesh gate, when the network device receives a second notification from the candidate peer and the second notification indicates that the candidate peer does not function as the mesh gate now, having the network device update the current record and then verifying whether the candidate peer functions as the mesh gate S520 — after the network device sends the inquiring packet, having the network device update the current record again to confirm that the candidate peer does not function as the mesh gate if one of following circumstances holds true: the network device receiving a second reply packet from the candidate and the second reply packet indicating that the candidate peer does not function as the mesh gate; and provided the network device does not receive any of the updated first notification and the second notification, the network device receiving none of the first reply packet and the second reply packet in another predetermined time

Fig. 5

METHOD FOR ACTIVELY VERIFYING WHETHER CANDIDATE PEER IS MESH GATE AND METHOD FOR DETERMINING PRIMARY MESH GATE

BACKGROUND OF THE INVENTION

1. Field of the Invention

The present invention relates to methods applicable to a mesh network, especially to a method for actively verifying whether a candidate peer functions as a mesh gate and a method for determining a primary mesh gate.

2. Description of Related Art

The IEEE 802.11s standard is established for mesh networking. According to the IEEE 802.11s standard, if two mesh stations have the same mesh profile and their basic transmission rates and encryption capabilities match up, each of the two stations is the candidate peer for the other and thus they can connect with each other directly. Accordingly, all mesh stations having the same mesh profile and being directly/indirectly coupled together can form a mesh basic service set (MBSS). In an MBSS, each mesh station capable of directly connecting to a non-mesh network through a distribution system (DS) is called a mesh gate; other kinds of mesh stations in the MBSS are allowed to indirectly access resources outside the MBSS through a mesh gate in the MBSS. In this technical field, the above-mentioned distribution system is a configuration used to interconnect basic service sets (BSSs).

According to the IEEE 802.11s standard, two mesh stations having the same mesh profile can connect with each other; this will allow a plurality of mesh stations having the same mesh profile to establish several MBSSs through different channels (e.g., channels of wireless local area network such as the fourteen channels of the 2.4 GHz frequency band) while these MBSSs are not interconnected. Unfortunately, some MBSSs in the above-mentioned non-interconnected MBSSs may have no mesh gate and this kind of MBSSs are incapable of connecting to an external network.

Besides, according to the IEEE 802.11s standard, a mesh station functioning as a mesh gate in an MBSS will announce its role by a broadcast packet; since the IEEE 802.11s standard lacks a retransmission and acknowledgement mechanism, the other mesh stations in the MBSS cannot actively verify whether the mesh station is still functioning as the mesh gate and cannot actively search for the other available mesh gates in the MBSS.

In addition, when several mesh gates in the same MBSS are allowed to access the same distribution system, there will be several paths between the MBSS and the distribution system; as a result, the network composed of the MBSS and the distribution system may encounter a broadcast storm due to a loop composed of paths. The IEEE 802.11s standard uses the Rapid Spanning Tree Protocol (RSTP) to prevent a broadcast storm. The RSTP blocks up the critical path of the above-mentioned loop in the topology of the network, and thus not only broadcast and multicast packets but also unicast packets are not allowed to be transmitted via the critical path; consequently, path options for transmitting unicast packets are decreased and a transmission bottleneck of unicast packets may occur.

SUMMARY OF THE INVENTION

An object of the present disclosure is to provide a method for actively verifying whether a candidate peer functions as a mesh gate and a method for determining a primary mesh gate as improvements over the prior art.

An embodiment of the present method for actively verifying whether a candidate peer functions as a mesh gate is carried out by a network device in a mesh basic service set (MBSS) including the candidate peer. This embodiment includes the following steps: in a first circumstance that a current record of the network device indicates that the candidate peer does not function as the mesh gate, when the network device receives a first notification from the candidate peer and the first notification indicates that the candidate peer now functions as the mesh gate, having the network device update the current record and start a counting process and then verifying whether the candidate peer continues functioning as the mesh gate till the end of the counting process, wherein the counting process lasts for a predetermined time; when the network device fails to receive an updated first notification indicative of the candidate functioning as the mesh gate from the candidate peer before the end of the counting process, having the network device send an inquiring packet to the candidate peer to verify whether the candidate peer is still functioning as the mesh gate; and after the network device sends the inquiring packet, when the network device receives the updated first notification or receives a first reply packet indicative of the candidate peer functioning as the mesh gate from the candidate peer, having the network device restart the counting process and verifying whether the candidate peer continues functioning as the mesh gate till the end of the counting process again.

An embodiment of the present method for determining a primary mesh gate of a mesh basic service set (MBSS) is carried out by a network device in the MBSS, wherein the MBSS includes mesh gates. This embodiment includes: when the network device is not one of the mesh gates, having the network device receive the information of the mesh gates to let the network device process the information of the mesh gates according to a predetermined algorithm and thereby determine the primary mesh gate of the mesh gates; when the network device is one of the mesh gates and the mesh gates include the network device and M mesh gate(s), having the network device receive information of the M mesh gate(s) to let the network device process the information of the network device and the information of the M mesh gate(s) according to the predetermined algorithm and thereby determine the primary mesh gate of the mesh gates, in which the M is a positive integer; and forbidding any of the mesh gates except the primary mesh gate to transmit or receive a non-unicast packet through a distribution system.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 5 shows another embodiment of the present method for actively verifying whether a candidate peer functions as a mesh gate.

DETAILED DESCRIPTION OF THE PREFERRED EMBODIMENTS

Figure 1:
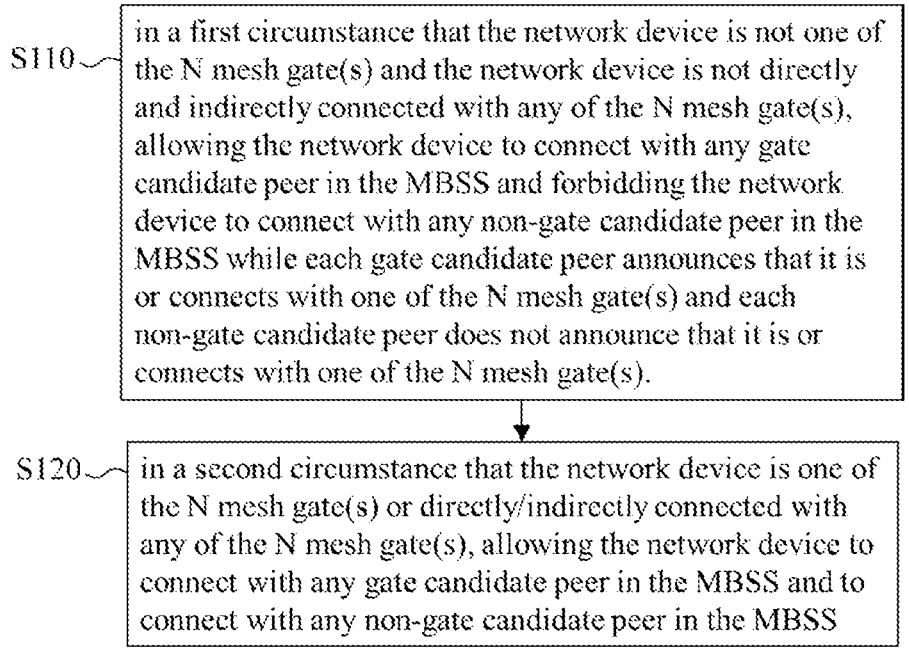
FIG. 1 shows an embodiment of the present method for wireless connection.

FIG. 1 shows an embodiment of the present method for wireless connection. This embodiment is carried out by a network device in a mesh basic service set (MBSS) including N mesh gate(s). The N is a positive integer. The embodiment of FIG. 1 includes the following steps:

step S110: in a first circumstance that the network device is not one of the N mesh gate(s) and the network device is not directly and indirectly connected with any of the N mesh gate(s), allowing the network device to connect with any gate candidate peer in the MBSS and forbidding the network device to connect with any non-gate candidate peer in the MBSS while each gate candidate peer announces that it is or connects with one of the N mesh gate(s) and each non-gate candidate peer does not announce that it is or connects with one of the N mesh gate(s). It should be noted that each network device in the MBSS may broadcast a beacon periodically to let the other devices be aware of any available gate candidate peer. It should also be noted that "X of Y" is interpreted as "X is Y" or "X being a part of Y" in this specification.

step S120: in a second circumstance that the network device is one of the N mesh gate(s) or directly/indirectly connected with any of the N mesh gate(s), allowing the network device to connect with any gate candidate peer in the MBSS and to connect with any non-gate candidate peer in the MB SS.

Figure 2:
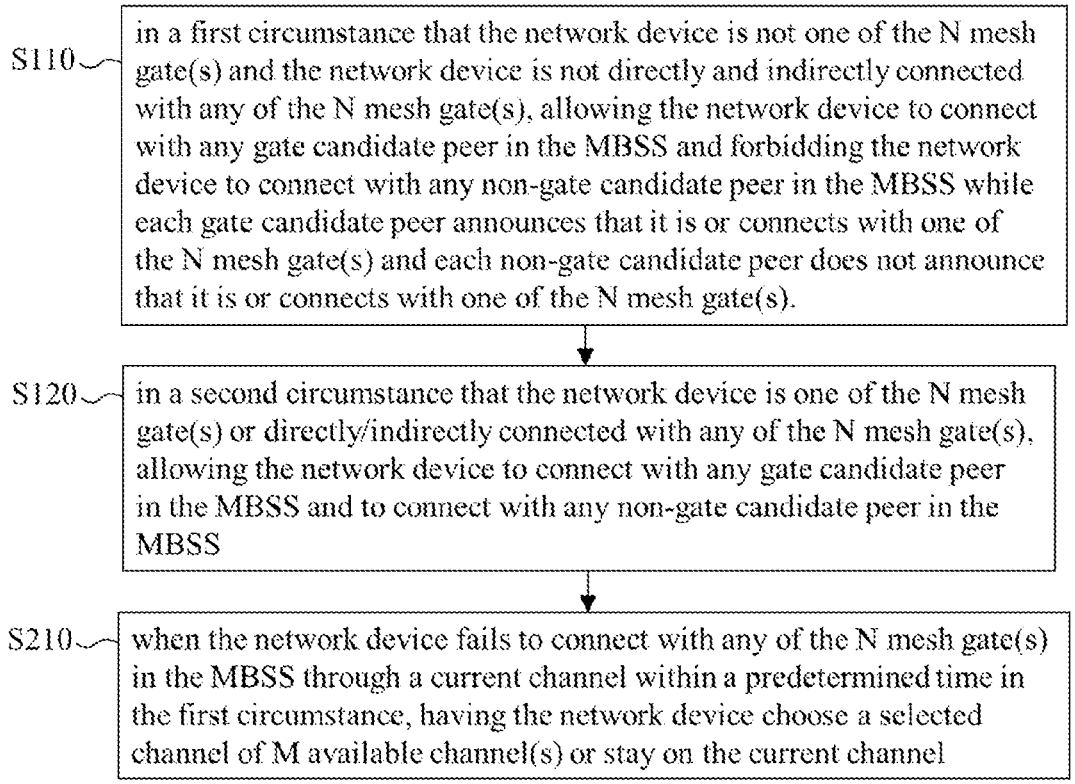
FIG. 2 shows another embodiment of the present method for wireless connection.

FIG. 2 shows another embodiment of the wireless connection method of the present disclosure. Compared with the embodiment of FIG. 1, the network device of the embodiment of FIG. 2 is a wireless network device preferably, and the embodiment of FIG. 2 further includes:

step S210: when the network device fails to connect with any of the N mesh gate(s) in the MBSS through a current channel (e.g., a channel of a wireless local area network such as any of the fourteen channels of the 2.4 GHz frequency band) within a predetermined time in the aforementioned first circumstance, having the network device choose a selected channel of M available channel(s) or stay on the current channel, wherein the M is an integer greater than or equal to zero. More specifically, provided the M is greater than zero, step S210 has the network device choose a selected channel of the M channel(s); and provided the M is zero (i.e., no other available channel), step S210 has the network device continue using the current channel. In light of the above, the embodiment of FIG. 2 can allow the network device to try any of the M channel(s) in order to directly/indirectly connect with any of the N mesh gate(s). In an exemplary implementation, step S210 includes: having the network device execute a channel scanning operation to find out the M available channel(s), in which a message of a candidate peer in the MBSS announcing that the candidate peer is or directly/indirectly connects with one of the N mesh gate(s) can be found in each of the M channel(s); and having the network device choose the selected channel of the M channel(s) according to a predetermined algorithm which could be based on signal strength, signal stability, transmission rate, etc.

It should be noted that in the aforementioned embodiments, in order to make sure all network devices in the MBSS directly/indirectly connect with a mesh gate, the network device of FIGS. 1/2 and the other network devices in the MBSS execute the present method for wireless connection; however, the implementation of the present invention is not limited thereto. It should also be noted that in the aforementioned embodiments, the MBSS meets the IEEE 802.11s standard; however, this is for understanding rather than limitations.

Figure 3:
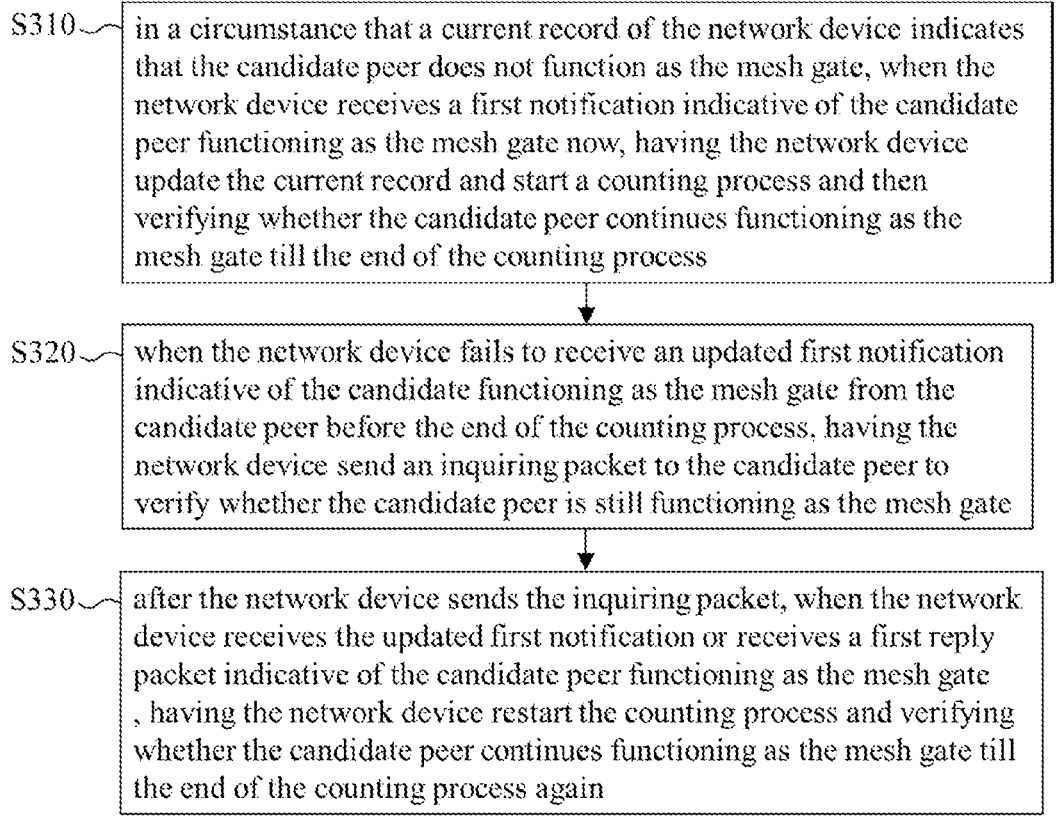
FIG. 3 shows an embodiment of the present method for actively verifying whether a candidate peer functions as a mesh gate.
Figure 4:
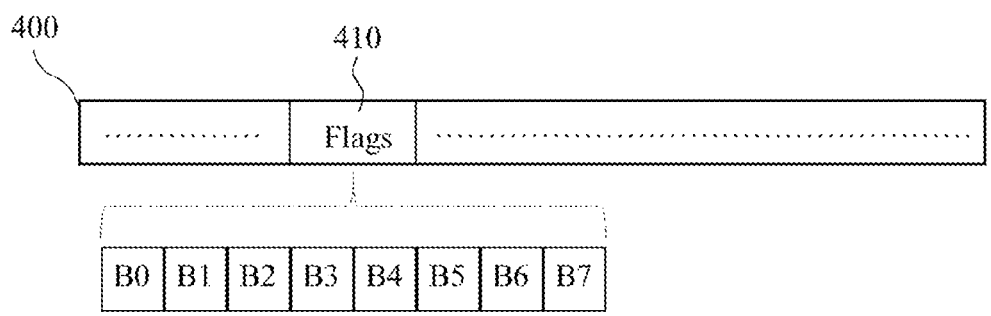
FIG. 4 shows an embodiment of a first/second reply packet for the present method.

FIG. 3 shows an embodiment of the present method for actively verifying whether a candidate peer functions as a mesh gate. This embodiment is carried out by a network device in an MBSS including the candidate peer. The embodiment of FIG. 3 includes the following steps:

step S310: in a circumstance that a current record of the network device indicates that the candidate peer does not function as the mesh gate, when the network device receives a first notification (e.g., "GANN of Mesh_A=1" of FIG. 6) from the candidate peer and the first notification indicates that the candidate peer now functions as the mesh gate, having the network device update the current record and start a counting process and then verifying whether the candidate peer continues functioning as the mesh gate till the end of the counting process, wherein the counting process lasts for a predetermined time.

step S320: when the network device fails to receive an updated first notification (e.g., "GANN of Mesh_A=1" of FIG. 6) indicative of the candidate functioning as the mesh gate from the candidate peer before the end of the counting process, having the network device send an inquiring packet (e.g., "Tx PREQ to Mesh_A" of FIG. 6) to the candidate peer to verify whether the candidate peer is still functioning as the mesh gate.

step S330: after the network device sends the inquiring packet, when the network device receives the updated first notification or receives a first reply packet (e.g., "PREP from Mesh_A=1" of FIG. 6) indicative of the candidate peer functioning as the mesh gate from the candidate peer, having the network device restart the counting process and verifying whether the candidate peer continues functioning as the mesh gate till the end of the counting process again. In an exemplary implementation, each of the inquiring packet and the first reply packet is a unicast packet. In an exemplary implementation, the inquiring packet meets the regulation of the IEEE 802.11s standard on a path request packet (PREQ) and the first reply packet meets the regulation of the IEEE 802.11s standard on a path reply packet (PREP); for instance, as shown in FIG. 4 a bit "B0" of a flags filed 410 including bits B0-B7 is a reserved bit under the 802.11s standard while the value (0 or 1) of the bit B0 of the first reply packet 400 is used to indicate whether the candidate peer functions as the mesh gate.

Compared with the embodiment of FIG. 3, another embodiment of the present method for actively verifying whether a candidate peer functions as a mesh gate includes additional steps as shown in FIG. 5. The steps of FIG. 5 include:

step S510: in a circumstance that the current record of the network device is indicative of the candidate peer functioning as the mesh gate, when the network device receives a second notification (e.g., "GANN of Mesh_A=0" of FIG. 6) from the candidate peer and the second notification indicates that the candidate peer does not function as the mesh gate now, having the network device update the current record and then verifying whether the candidate peer functions as the mesh gate.

step S520: after the network device sends the inquiring packet, having the network device update the current record again to confirm that the candidate peer does not function as the mesh gate if one of following circumstances holds true: the network device receiving a second reply packet (e.g., "PREP from Mesh_A=0" of FIG. 6) from the candidate peer and the second reply packet indicating that the candidate peer does not function as the mesh gate; and provided the network device does not receive any of the updated first notification and the second notification, the network device receiving none of the first reply packet and the second reply packet in another predetermined time. In an exemplary implementation, each of the inquiring packet, the first reply packet, and the second reply packet is a unicast packet. In an exemplary implementation, each of the first reply packet and the second reply packet meets the regulation of the IEEE 802.11s standard on a path reply packet; for instance, a bit of a flags filed of each of the first reply packet and the second reply packet (e.g., the packet 400 of FIG. 4) is a reserved bit under the 802.11s standard while a first value (e.g., 1) of this bit of the first reply packet is indicative of the candidate peer functioning as the mesh gate and a second value (e.g., 0) of this bit of the second reply packet indicates that the candidate peer does not function as the mesh gate.

Figure 6:
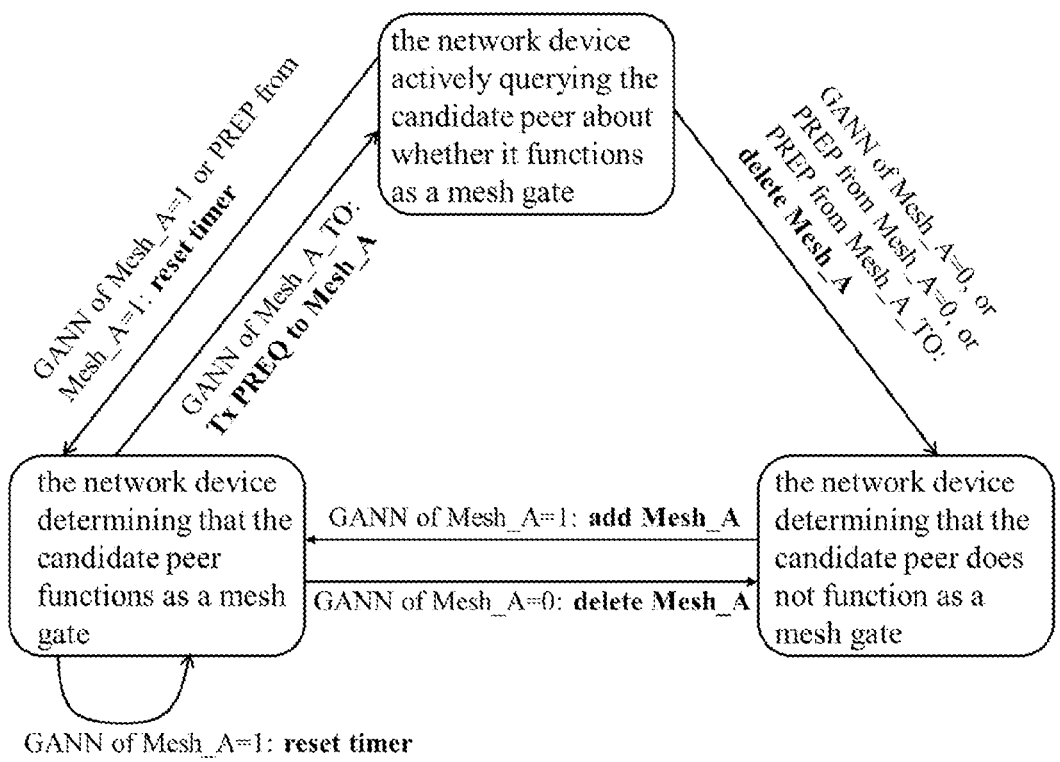
FIG. 6 shows a finite state machine illustrating the embodiments of FIG. 3 and FIG. 5.

The embodiments of FIG. 3 and FIG. 5 can be illustrated with the finite state machine (FSM) of FIG. 6. The FSM of FIG. 6 includes three states as follows: "the network device determining that the candidate peer does not function as a mesh gate"; "the network device determining that the candidate peer functions as a mesh gate"; and "the network device actively querying the candidate peer about whether the candidate peer functions as a mesh gate". In FIG. 6, each path between any two states is indicative of state change, and the arrow of each path indicates how the state changes; the annotation of each path is explained in Table 1 below, wherein the explanation in non-bold characters stands for a requirement for state change and the explanation in bold characters stands for an action to be executed when a requirement is filled.

TABLE 1

| annotation | explanation |
| --- | --- |
| Mesh_A | candidate peer |
| GANN | gate announcement |
| PREQ | path request packet (inquiring packet) |
| PREP | path reply packet (first/second reply packet) |
| GANN of Mesh_A = 1: add Mesh_A | if Mesh_A announces itself being a mesh gate, the network device updates the mesh gate record to include the information of Mesh_A |
| GANN of Mesh_A = 0: delete Mesh_A | if Mesh_A does not announce itself being a mesh gate, the network device deletes the information of Mesh_A from the mesh gate record |
| GANN of Mesh_A = 1: reset timer | if the network device receives a notification indicative of Mesh_A announcing itself being a mesh gate, the network device restarts the counting process |
| GANN of Mesh_A_TO: Tx PREQ to Mesh_A | if Mesh_A does not broadcast GANN during the counting process, |

TABLE 1-continued

| annotation | explanation |
| --- | --- |
|  | the network device sends a PREQ to Mesh_A |
| GANN of Mesh_A = 1 or PREP from Mesh_A = 1: reset timer | if the network device receives a notification indicative of Mesh_A announcing itself being a mesh gate or receives a path reply packet of Mesh_A indicative of Mesh_A being a mesh gate, the network device restarts the counting process |
| GANN of Mesh_A = 0, or PREP from Mesh_A = 0, or PREP from Mesh_A_TO: delete Mesh_A | The network device deletes the information of Mesh_A from the mesh gate record if Mesh_A does not announce itself being a mesh gate, a path reply packet of Mesh_A indicates that Mesh_A is not a mesh gate, or the network device does not receive a PREP from Mesh_A in another predetermined time. |

Figure 7:
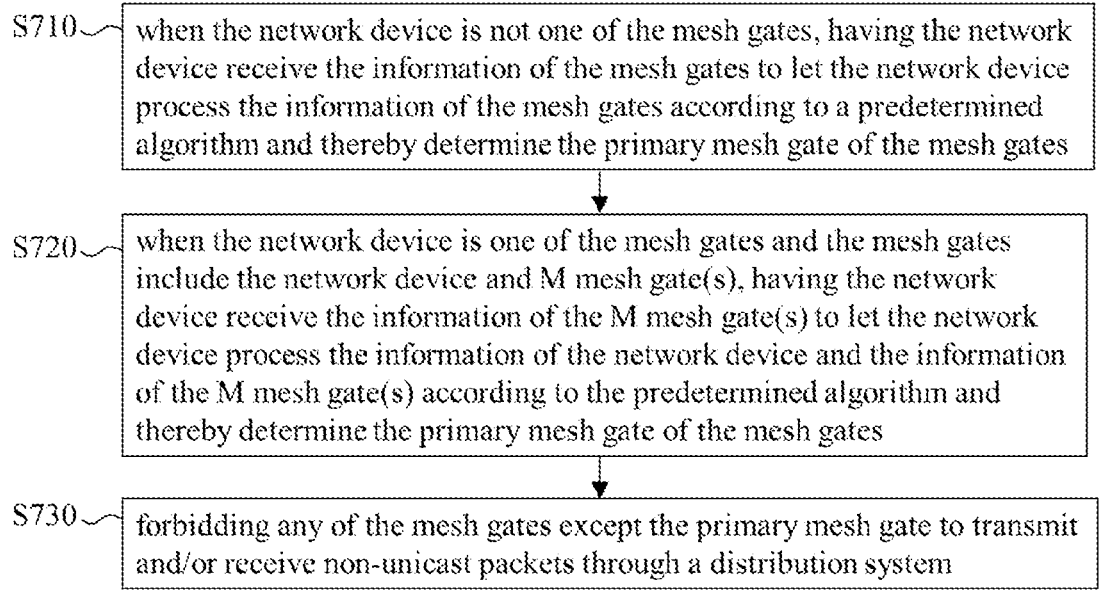
FIG. 7 shows an embodiment of the present method for determining a primary mesh gate in an MB SS.

FIG. 7 shows an embodiment of the present method for determining a primary mesh gate of a mesh basic service set (MBSS). This embodiment is carried out by a network device in the MBSS including mesh gates. The embodiment of FIG. 7 includes the following steps:

step S710: when the network device is not one of the mesh gates, having the network device receive the information of the mesh gates to let the network device process the information of the mesh gates according to a predetermined algorithm and thereby determine the primary mesh gate of the mesh gates. In an exemplary implementation, step S710 has the network device periodically/non-periodically receive the information of the mesh gates so as to know whether the primary mesh gate should be redetermined.

step S720: when the network device is one of the mesh gates and the mesh gates include the network device and M mesh gate(s), having the network device receive the information of the M mesh gate(s) to let the network device process the information of the network device and the information of the M mesh gate(s) according to the predetermined algorithm and thereby determine the primary mesh gate of the mesh gates, in which the M is a positive integer. In an exemplary implementation, the predetermined algorithm is based on the stability of a distribution system (DS) transmitting broadcast packets and multicast packets; for instance, if one of the mesh gates is connected to a distribution system through Ethernet while the other mesh gates are connected to the distribution system wirelessly, the predetermined algorithm determines the mesh gate using Ethernet as the primary mesh gate. In an exemplary implementation, when the mesh gates have identical transmission merits, the predetermined algorithm chooses the mesh gate having a least media access control (MAC) address functions as the primary mesh gate.

step S730: forbidding any of the mesh gates except the primary mesh gate to transmit and/or receive non-unicast packets through a distribution system. In an exemplary implementation, the primary mesh gate is allowed to transmit and receive non-unicast packets and unicast packets while the other mesh gates are not allowed to transmit and receive non-unicast packets but allowed to transmit and receive unicast packets. In an exemplary implementation, the non-unicast packet is a broadcast packet or a multicast packet.

It should be noted that people of ordinary skill in the art can implement the present invention by selectively using some or all of the features of any embodiment in this specification or selectively using some or all of the features of multiple embodiments (e.g., FIG. 5 and FIG. 7) in this specification as long as such implementation is practicable, which implies that the present invention can be carried out flexibly. Besides, the steps of each method embodiment can be executed in self-determined order if practicable. In addition, each method embodiment of the present disclosure could be in the form of a software and/or a firmware and carried out by a known or self-developed network device.

To sum up, the wireless connection method of the present disclosure can ensure that a network device is a mesh gate or directly/indirectly connected with a mesh gate; the method of the present disclosure for actively verifying whether a candidate peer functions as a mesh gate can allow a network device to verify whether the candidate peer functions as a mesh gate without waiting for the announcement from the candidate peer; the method of the present disclosure for determining a primary mesh gate in an MBSS can prevent a broadcast storm caused by a lot of mesh gates accessing the same distribution system.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A method for actively verifying whether a candidate peer functions as a mesh gate, the method being carried out by a network device in a mesh basic service set (MBSS), the MBSS including the candidate peer, the method comprising:
    in a first circumstance that a current record of the network device indicates that the candidate peer does not function as the mesh gate, when the network device receives a first notification from the candidate peer and the first notification indicates that the candidate peer functions as the mesh gate, having the network device update the current record and start a counting process and then verifying whether the candidate peer continues functioning as the mesh gate till an end of the counting process, wherein the counting process lasts for a predetermined time;
    when the network device fails to receive an updated first notification indicative of the candidate functioning as the mesh gate from the candidate peer before the end of the counting process, having the network device send an inquiring packet to the candidate peer to verify whether the candidate peer functions as the mesh gate; and
    after the network device sends the inquiring packet, when the network device receives the updated first notification or receives a first reply packet indicative of the candidate peer functioning as the mesh gate from the candidate peer, having the network device restart the counting process and verifying whether the candidate peer continues functioning as the mesh gate till the end of the counting process again.

2. The method of claim 1, further comprising:
    in a second circumstance that the current record of the network device is indicative of the candidate peer functioning as the mesh gate, when the network device receives a second notification from the candidate peer and the second notification indicates that the candidate peer does not function as the mesh gate, having the network device update the current record and then verifying whether the candidate peer functions as the mesh gate; and
    after the network device sends the inquiring packet, having the network device update the current record to confirm that the candidate peer does not function as the mesh gate if one of following circumstances holds true: the network device receiving a second reply packet from the candidate and the second reply packet indicating that the candidate peer does not function as the mesh gate; and provided the network device does not receive any of the updated first notification and the second notification, the network device receiving none of the first reply packet and the second reply packet in another predetermined time.

3. The method of claim 2, wherein each of the inquiring packet, the first reply packet, and the second reply packet is a unicast packet.

4. The method of claim 2, wherein the inquiring packet meets a regulation of an IEEE 802.11s standard on a path request packet, and each of the first reply packet and the second reply packet meets a regulation of the IEEE 802.11s standard on a path reply packet.

5. The method of claim 4, wherein an indicator bit of the first reply packet indicates that the candidate peer functions as the mesh gate on condition that a value of the indicator bit of the first reply packet is a first value, an indicator bit of the second reply packet indicates that the candidate peer does not function as the mesh gate on condition that a value of the indicator bit of the second reply packet is a second value, the first value and the second value are different, and each of the indicator bit of the first reply packet and the indicator bit of the second reply packet is a reserved bit under the IEEE 802.11s standard.

6. The method of claim 1, wherein each of the inquiring packet and the first reply packet is a unicast packet.

7. The method of claim 1, wherein the inquiring packet meets a regulation of an IEEE 802.11s standard on a path request packet, and the first reply packet meets a regulation of the IEEE 802.11s standard on a path reply packet.

8. The method of claim 7, wherein a bit of the first reply packet indicates that the candidate peer functions as the mesh gate, and the bit is a reserved bit under the IEEE 802.11s standard.

9. The method of claim 1, wherein the MBSS includes mesh gates, and the method further comprises following steps to determine a primary mesh gate of the mesh gates in the MBSS:
    when the network device is not one of the mesh gates, having the network device receive information of the mesh gates to find out the primary mesh gate of the mesh gates;
    when the network device is one of the mesh gates and the mesh gates include the network device and M mesh gate(s), having the network device send information of the network device to the M mesh gate(s) and receive information of the M mesh gate(s) and letting the network device use a predetermined algorithm to find out the primary mesh gate of the mesh gates according to the information of the network device and the information of the M mesh gate(s), in which the M is a positive integer; and
    forbidding any of the mesh gates except the primary mesh gate to transmit or receive a non-unicast packet through a distribution system.

10. The method of claim 9, further comprising: when at least one of the information of the network device and the information of the M mesh gate(s) changes, having the network device use the predetermined algorithm to find out the primary mesh gate of the mesh gates according to the information of the network device and the information of the M mesh gate(s) again.

11. A method for determining a primary mesh gate of a mesh basic service set (MBSS), the method being carried out by a network device in the MBSS, the MBSS including mesh gates, the method comprising:

when the network device is not one of the mesh gates, having the network device receive information of the mesh gates to let the network device process the information of the mesh gates according to a predetermined algorithm and thereby determine the primary mesh gate of the mesh gates;

when the network device is one of the mesh gates and the mesh gates include the network device and M mesh gate(s), having the network device receive information of the M mesh gate(s) to let the network device process the information of the network device and the information of the M mesh gate(s) according to the predetermined algorithm and thereby determine the primary mesh gate of the mesh gates, in which the M is a positive integer; and forbidding any of the mesh gates except the primary mesh gate to transmit or receive a non-unicast packet through a distribution system.

12. The method of claim 11, wherein the non-unicast packet is a broadcast packet or a multicast packet.

13. The method of claim 11, further comprising: when at least one of the information of the network device and the information of the M mesh gate(s) changes, having the network device use the predetermined algorithm to determine the primary mesh gate of the mesh gates in accordance with the information of the network device and the information of the M mesh gate(s) again.

14. The method of claim 11, wherein when the mesh gates have identical transmission merits, a mesh gate of the mesh gates having a least media access control address functions as the primary mesh gate.

* * * * *